US011972528B2

United States Patent
Hauswiesner et al.

(10) Patent No.: US 11,972,528 B2
(45) Date of Patent: Apr. 30, 2024

(54) METHOD AND COMPUTER PROGRAM PRODUCT FOR PROCESSING MODEL DATA OF A SET OF GARMENTS

(71) Applicant: Reactive Reality GmbH, Graz (AT)

(72) Inventors: Stefan Hauswiesner, Graz (AT); Philipp Grasmug, Graz (AT); Alexander Pilz, Graz (AT)

(73) Assignee: Reactive Reality GmbH, Graz (AT)

( * ) Notice: Subject to any disclaimer, the term of this patent is extended or adjusted under 35 U.S.C. 154(b) by 147 days.

(21) Appl. No.: 17/706,689

(22) Filed: Mar. 29, 2022

(65) Prior Publication Data

US 2022/0215631 A1  Jul. 7, 2022

Related U.S. Application Data

(63) Continuation of application No. PCT/EP2020/076907, filed on Sep. 25, 2020.

(30) Foreign Application Priority Data

Sep. 30, 2019 (EP) ..................................... 19200619

(51) Int. Cl.
*G06T 19/00* (2011.01)
*G06T 11/00* (2006.01)
*G06T 17/20* (2006.01)

(52) U.S. Cl.
CPC .............. *G06T 19/00* (2013.01); *G06T 11/00* (2013.01); *G06T 17/20* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 2015/0058172 A1* | 2/2015 | Nandyal | ............... G06F 16/951 705/26.63 |
| 2017/0161948 A1* | 6/2017 | Hua | ........................ A41H 1/02 |
| 2017/0372515 A1 | 12/2017 | Hauswiesner et al. | |

FOREIGN PATENT DOCUMENTS

| | | | |
|---|---|---|---|
| EP | 3038053 A1 | 6/2016 | |
| JP | H07320089 A | 12/1995 | |

(Continued)

OTHER PUBLICATIONS

Elsheikh et al. "A reliable triangular mesh intersection algorithm and its application in geological modelling", Engineering with Computers (2014) 30:143-157 (Year: 2014).*

(Continued)

*Primary Examiner* — Saptarshi Mazumder
(74) *Attorney, Agent, or Firm* — Eschweiler & Potashnik, LLC

(57) ABSTRACT

A method for processing model data of a set of garments includes storing first and second model data of a first and a second garment of the set, each of the model data including two-dimensional or three-dimensional geometry data defining a mesh associated with the respective garment. A limiting object of the respective garment is defined by at least a portion of the geometry data and constitutes a separation between an interior and an exterior of the respective garment. The first and the second garment constitute an inner garment and an outer garment that is worn over the inner garment. At least one opening object for the outer garment is stored, defined as a portion of the limiting object and constituting a transition for an item between the interior and the exterior of the outer garment. Intersection objects are determined for each of the garments, defining one or more intersections between the limiting objects of the garments. For each garment, portions of the limiting objects are determined as overlap section objects bounded by one or (Continued)

more of the intersection objects. The geometry data of the first and/or the second garment are adjusted with respect to the overlap section objects based on whether the respective overlap section object of the outer garment at least partially comprises one or more of the at least one opening objects of the outer garment.

14 Claims, 9 Drawing Sheets

(56) References Cited

FOREIGN PATENT DOCUMENTS

| | | |
|---|---|---|
| JP | 2002117414 A | 4/2002 |
| JP | 2015215763 A | 12/2015 |

OTHER PUBLICATIONS

Hiroki, Y. et al.: "Image-Based Virtual Fitting System with Garment Image Reshaping" 2014 International Conference on Cyberworlds, IEEE, Oct. 6, 2014, pp. 47-54, XP032703300.
A. Cook IV, C. Wenk: "Geodesic Fréchet distance inside a simple polygon" ACM Transactions on Algorithms 7 (2010), pp. 9:1-9:19.
A. Lee, D. Dobkin, W. Sweldens, P. Schröder: "Multiresolution Mesh Morphing" Proc. of SIGGRAPH 99, pp. 343-350, 1999.
C. Gotsman, V. Surazhsky: "Guaranteed intersection-free polygon morphing" Computers & Graphics 25 (2001), pp. 67-75.
D. Douglas, T. Peucker: "Algorithms for the reduction of the number of points required to represent a digitized line or its caricature" In: The Canadian Cartographer 10, 1973, pp. 112-122.
H. Edelsbrunner, E. P. Mücke: "Simulation of simplicity: a technique to cope with degenerate cases in geometric algorithms" ACM Transactions on Graphics 9 (1990), pp. 66-104.
J. O'Rourke: Computational Geometry in C (Second Edition), Cambridge University Press, 1998, pp. 286ff.
M. Attene, M. Campen, and L. Kobbelt: Polygon Mesh Repairing: "An Application Perspective" ACM Computing Surveys 45 (2013), article 15.
O. Sorkine: "Differential Representations for Mesh Processing" Computer Graphics forum 25 (2006), pp. 789-807.
P. Shor and C. van Wyk: "Detecting and decomposing self-overlapping curves" Computational Geometry 2 (1992), pp. 31-50.
Y. Weng, W. Xu, Y. Wu, K. Zhou and B. Guo: "2D Shape Deformation Using Nonlinear Least Squares Optimization" The Visual Computer 22 (2006), pp. 653-660.
Wikipedia.org "Ramer-Douglas-Peucker algorithm" Published on Jan. 4, 2022.
European Search Report dated Apr. 17, 2020 for European Application No. 19200619.5.
Office action dated Aug. 17, 2022 in connection with India application No. 202227020528.

* cited by examiner a) b) c)

METHOD AND COMPUTER PROGRAM PRODUCT FOR PROCESSING MODEL DATA OF A SET OF GARMENTS

REFERENCE TO RELATED APPLICATIONS

This application is a Continuation of International Application number PCT/EP2020/076907, filed on Sep. 25, 2020, which claims priority to European Application number 19200619.5, filed on Sep. 30, 2019. The contents of the above-referenced patent applications are hereby incorporated by reference in their entirety.

FIELD

The present disclosure relates to a computer implemented method and a computer program product for processing model data of a set of garments.

BACKGROUND

One aim of systems for clothing visualization is to present the combination of different models of clothes (e.g., CAD models or models captured by photography) to designers, marketing staff and potential customers. To allow for maximal flexibility in this process, garment models should be designed or captured independently from each other, disregarding the ways they will be combined later. Hence, this process involves a human model and independent garment models, which should be combined.

However, the combination of two or more independently created garment models can be challenging if yielding at visually satisfying and/or technically correct results. For example, when combining a shirt and a jacket, parts of the shirt should not appear where they are inside the jacket, e.g. at the arm pits, even when the extent of the shirt model is not covered by the projection of the jacket model in the vicinity of this position. In contrast to that, the shirt should appear at openings of the jacket, e.g. next to the lapel or the sleeves.

Conventional approaches require manual correction of a combined output of the garments.

SUMMARY

The present disclosure provides an improved processing concept that allows the technically correct adjustment of garment model data of two or more garments to be worn together.

The improved processing concept is based on the insight that in physical models, the shape of each garment is influenced both by the other garment(s) and/or by the underlying human model or avatar. The improved processing concept therefore describes an approach that algorithmically manipulates garment models and optionally avatar models such that undesired visual overlap of the models is avoided. It is both suitable for two-dimensional, 2D, and three-dimensional, 3D, models.

According to the improved processing concept, the model data comprise respective geometry data defining a mesh associated with the respective garment. A limiting object of the respective garment is defined by at least a portion of the geometry data and constitutes a separation between an interior and an exterior of the respective garment. In addition, opening objects are defined for each garment model except for an innermost garment, for which this is optional. Intersections between the garments are determined, defining intersection objects for each of the garment models. These are the basis for adjustments as these potentially define technically incorrect appearances, if the garments are combined. For example, portions of the limiting object of an inner garment that appear on the outside of the outer garment are bounded by the intersection objects. Accordingly, portions of the limiting objects bounded by one or more of the intersection object of the respective garment can be determined as overlap section objects.

The geometry data of the garments can be adjusted with respect to the overlap section objects determined before, based on whether the respective overlap section object of an outer garment at least partially comprises one or more of the at least one opening objects of the outer garment.

This approach can be applied if a set of two garments is processed, i.e. an inner garment and an outer garment that is worn above the inner garment, or for a greater number of garments.

For example, if three or more garments in a set are processed, the processing can be started from the inside out, from the outside to the inside or in an arbitrary fashion. For example, adjustments to the geometry data of the respective garments are made until no intersections can be determined that require any further adjustments.

Considering the openings of the garments, respectively the output objects defined for the garment models, allows the extent of adjustment of the geometry data to be reduced, as less of an inner garment overlapping with an outer garment has to be hidden, e.g. in the area of the opening object. This also corresponds to the technical equivalent in the real world, where e.g. the sleeves of a shirt appear at the open sleeves of a jacket, or the like. Hence, a technically correct adjustment can be achieved.

In an embodiment of a computer-implemented method according to the improved processing concept for processing model data of a set of garments, the method comprises storing, e.g. in a computer system, first model data of a first garment of the set and second model data of a second garment of the set. For example, each of the first and the second model data comprise two-dimensional or three-dimensional geometry data defining a mesh associated with the respective garment. A limiting object of the respective garment is defined by at least a portion of the geometry data and constitutes a separation between an interior and an exterior of the respective garment. One of the first and the second garment is an inner garment and another one of the first and the second garment is an outer garment that is worn over the inner garment.

The method further comprises storing, in the computer system, at least one opening object for at least the outer garment, and optionally also for the inner garment. Each opening object is defined as a portion of the respective limiting object and constitutes a potential transition for an item, e.g. a garment or avatar, between the interior and the exterior of the respective garment, i.e. at least the outer garment.

The method further comprises determining, in the computer system, intersection objects for each of the first and the second garment, the intersection objects defining one or more intersections between the limiting objects of the first and the second garment. For each of the first and the second garment, portions of the limiting objects are determined in the computer system as overlap section objects bounded by one or more of the intersection objects of the respective garment. The geometry data of the first and/or the second garment are adjusted in the computer system with respect to the overlap section object based on whether the respective overlap section object of the outer garment at least partially comprises one or more of the at least one opening object of the outer garment.

For example, adjusting the geometry data of the first and/or the second garment is based on one of the following configurations being detected:
A) the respective overlap section object of the outer garment comprises no opening object of the outer garment;
B) the respective overlap section object of the outer garment in full comprises one of the at least one opening objects of the outer garment at least partially;
C) only a part of the respective overlap section object comprises one of the at least one opening objects of the outer garment at least partially;
D) the respective overlap section object of the outer garment comprises two or more of the at least one opening objects of the outer garment at least partially.

For example, the meshes associated with the garments are formed at least by a plurality of points or vertices and by a plurality of faces in connection with the points or vertices.

The method can be extended to three or more garments. For example, third model data of a third garment of the set are stored in a computer system, wherein the third model data comprise the same kind of geometry data as the first and the second model data. Also, a limiting object of the third garment is defined by at least a portion of the geometry data and constitutes a separation between an interior and an exterior of the third garment. For example, the third garment is to be worn over the second garment, and therefore also over the first garment.

Similar as for the first and the second garment, at least one opening object for the third garment is stored in the computer system, defined as a portion of the limiting object of the third garment and constituting a transition for an item, e.g. garment or avatar, between the interior and the exterior of the third garment. Intersection objects for the third garment are determined in the computer system, which define one or more intersections between a limiting object of the third garment and the limiting object of one of the first and the second garment. For each of the respective garments, e.g. for which the intersection objects have been determined, portions of the limiting objects are determined as overlap section objects bounded by one or more of the intersection objects of the respective garment. The geometry data of the respective garments are adjusted in the computer system with respect to the overlap section objects. This can also be based on whether the respective overlap section object of an outermost garment, e.g. the third garment, at least partially comprises one or more of the at least one opening objects of this outermost garment.

All of the garments of the set of garments may have been fitted to an avatar before being processed and potentially adjusted. The adjustments may result in that also a fitting to the avatar is concerned. For example, the adjustments of the garment may be such that a technically incorrect overlap between the avatar and the respective garment results.

Consequently, according to the improved processing concept, the method may further comprise that avatar model data of an avatar, on which the garments of the set are worn, are stored in a computer system. The avatar data comprises two-dimensional or three-dimensional geometry data like the garment model data, thereby defining a mesh associated with the avatar. A limiting object of the avatar is defined by at least a portion of the geometry data and constitutes a separation between an interior and an exterior of the avatar. Intersection objects for the avatar and for an innermost garment of the set are determined in the computer system, which intersection objects define one or more intersections between the limiting object of the avatar and the limiting object of the innermost object. Portions of the limiting objects are determined in a computer system for the avatar and the innermost garment as overlap section objects bounded by one or more of the intersection objects of the avatar and the garment. The geometry data of the avatar and/or the innermost garment are adjusted with respect to the respective overlap section objects.

The algorithms and/or considerations used for adjusting the geometry data of two garments may also be applied to the adjustment of the geometry data of the avatar and/or the innermost garment. Accordingly, model data of the garments and the avatar which are adapted to each other technically correctly can be achieved with the improved processing concept.

According to one embodiment of the improved processing concept, a computer program product for processing model data of a set of garments comprises a non-transitory computer-readable storage medium and computer program instructions stored therein, enabling a computer system to execute a method according to one of the implementations described above.

Furthermore, a computer system may have a processor and a storage medium having computer program instructions stored therein, enabling the processor to execute a method according to one of the implementations described above.

BRIEF DESCRIPTION OF THE DRAWINGS

The improved processing concept will be explained in more detail in the following with the aid of the drawings. Elements and functional blocks having the same or similar function bear the same reference numerals throughout the drawings. Hence their description is not necessarily repeated in following drawings.

In the drawings.

DETAILED DESCRIPTION

This disclosure describes an approach that algorithmically manipulates garment models and/or avatars such that undesired and/or technically incorrect visual overlap of the models is avoided. It is both suitable for two-dimensional and three-dimensional models.

Figure 1:
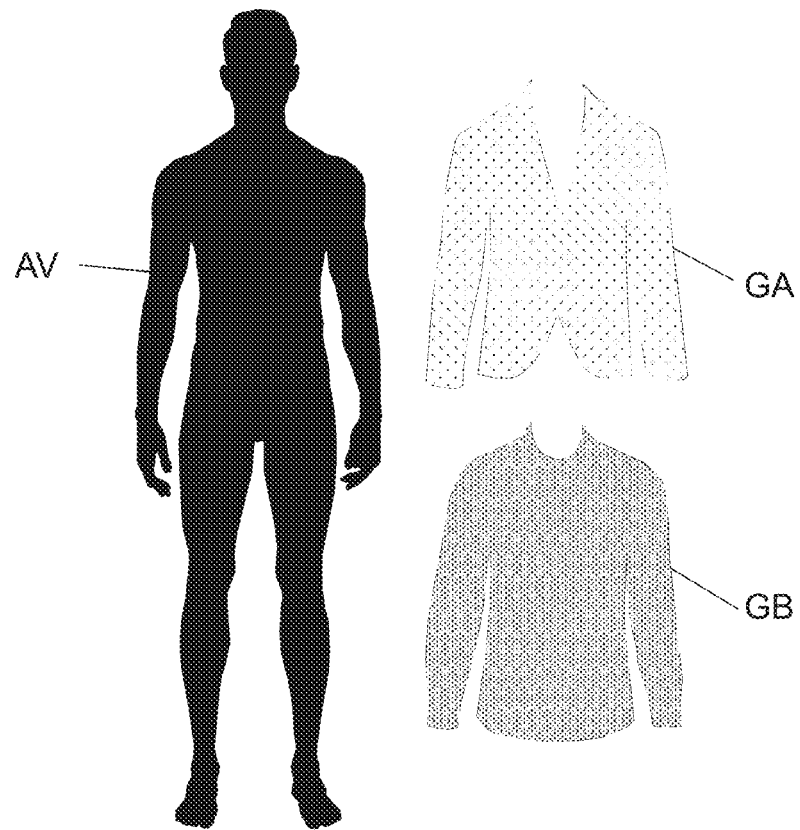
FIG. 1 shows example presentations of model data of garments and an avatar in separate form.

Referring now to FIG. 1, the most basic variant of the method for processing model data of a set of garments relies on the observation that the shape of a garment GB, e.g. representing a shirt, is usually influenced by a garment GA, e.g. representing a jacket, worn above it on an avatar AV, but the influence in the other direction is negligible or, at least, undesired. The method thus processes garment models according to a hierarchy that reflects which ones are worn above the others. Hence, although only two garments GA and GB are shown in FIG. 1, also a great a number of garments can be processed, forming a set of garments.

For example, first model data of the first garment of the set and second model data of the second garment of the set are stored, e.g. in a computer system, wherein each of the first and the second model data comprise two-dimensional or three-dimensional geometry data defining a mesh associated with the respective garment. One of the first and the second garment is an inner garment GA and the other one of the first and the second garment is an outer garment GB that is worn over the inner garment GA, e.g. on an avatar AV.

According to the improved processing concept, the shape of the garment models GA, GB in this hierarchy is incrementally adapted. The resulting garments can be rendered on top of the avatar AV. As, depending on a fitting process used for the input, there may also be an undesired overlap between the avatar AV and the garment models GA, GB, this overlap can be removed using a slightly adapted approach.

Figure 2:
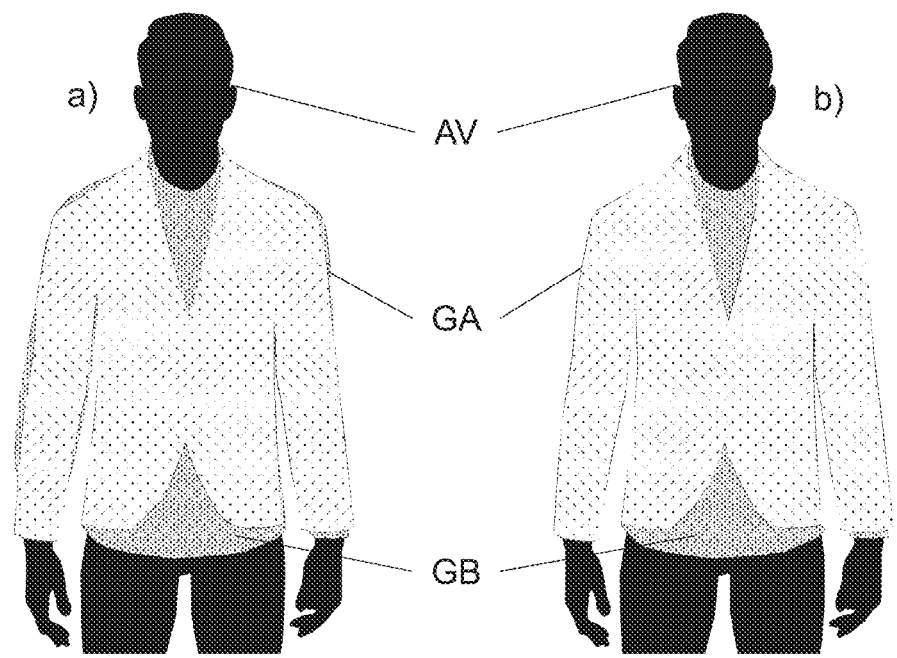
FIG. 2 shows example representations of model data of garments dressed on an avatar before and after overlap correction.

For example, FIG. 2 shows example representations of the garments GA, GB worn on the avatar AV. In the left part of FIG. 2, labelled a), the garments GA, GB are shown on the avatar AV in an unprocessed state where portions of the inner garment GB appear technically incorrect out of the outer garment GA, thereby creating an overlap. For example, this is visible at the sleeves or the shoulders of the shirt.

The right part of FIG. 2, labelled b), the garments GA, GB are shown in adjusted form after being processed according to the improved processing concept such that no overlaps that are technically incorrect remain.

However, the approach is not limited to resizing inner garment models according to garment models that are worn above it. The identification of the overlaps and their types also allows for removing the overlap by altering the outer garment model, or by changing both models, e.g. parameterized by physical properties of the modeled garments, e.g., flexibility and/or stiffness. The description of the method is thus separated into detecting the overlaps and their types and on processing them. The approach is algorithmically light-weight and requires no or little interaction with human operators. Further, it allows for adequately maintaining the texture of the garments while changing the shape. It is robust enough to work with three-dimensional models and/or self-overlapping two-dimensional models.

Figure 3:
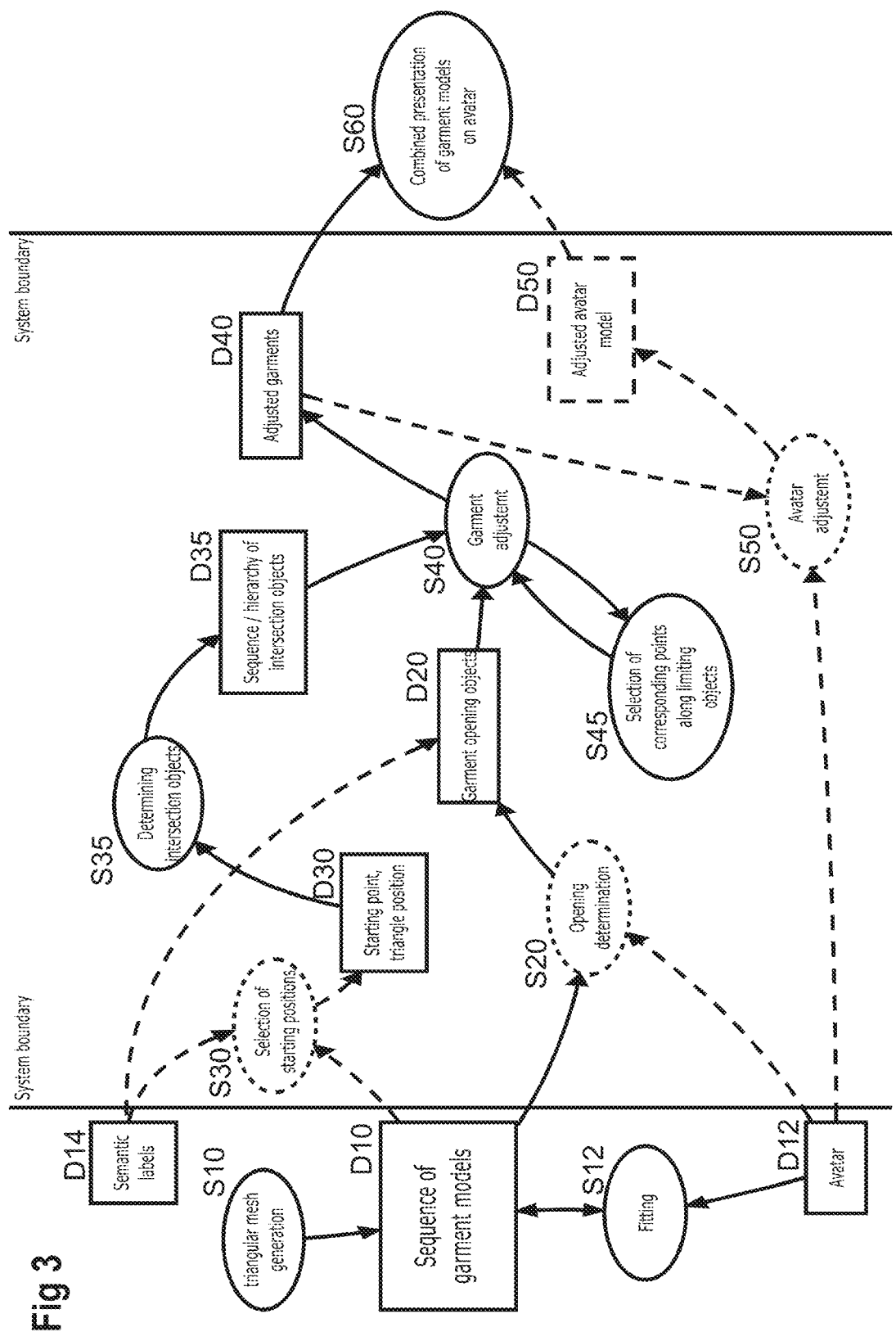
FIG. 3 shows an example block diagram of a method for processing model data of a set of garments according to the improved processing concept.

Referring now to FIG. 3, an example block diagram of a method for processing model data of a set of garments according to the improved processing concept is shown. The method is particularly carried out on a computer system that is able to store and process various kinds of information.

In the following, reference numerals starting with letter D followed by a number refer to data structures stored in the computer system, and reference numerals starting with letter S followed by a number refer to process steps carried out by the computer system. The system boundaries determine which process steps are carried outside the system and which data are input respectively output from the system or method.

The method takes as an input a sequence of garment models D10, i.e. respective model data. For example, the model data are generated in a triangular mesh generation step S10, in particular if a model with just an outline and no mesh is provided. If the provided model data have a mesh, step S10 can be expended with, for instance. Furthermore, the sequence of garment models D10 may be fitted to an avatar AV in a fitting step S12 taking into account model data D12 of the avatar AV. For example, 2D garment models are defined by their contour, e.g. a polygonal curve and a mesh that covers the visible part of the garment. Optionally, e.g. for proper texture representation, the model may contain vertices for 2D shape deformation, which will be explained in more detail further below. 3D garment models may be given by surface meshes. As in both variants the faces of the meshes can be triangulated using standard methods, it can be assumed for the following description that all meshes are triangular.

The sequence in which the garments are ordered reflects which garment is worn above the other. Terms like "inner" and "outer" refer to the relative positions of the garments in this sequence. For each garment of the sequence of garment models D10, a limiting object is defined by at least a portion of the geometry data and constitutes a separation between an interior and an exterior of the respective garment. For example, the geometry data corresponds to a mesh of the model data.

If the model data comprise 2D geometry data, each limiting object of a respective garment may be a closed continuous outline of the respective mesh, e.g. a polygonal curve. If the model data comprise 3D geometry data, each limiting object of a respective garment may be a surface of the respective mesh.

An avatar as defined by avatar model data D12 represents a human or mannequin on which the garment models are rendered. Similarly as for the garment model data, the avatar is either given as a two-dimensional outline with optional mesh and texture map, or as a three-dimensional surface mesh.

In the two-dimensional case, the garment models represent the front-facing part of a garment, e.g. as produced by a photography. The outline of the garment may be represented by a closed curve. Commonly, these are polygonal curves, which have piece-wise linear segments. However, the described method generalizes to outlines with a discrete description that can be processed by, e.g., a computer. For example, during the fitting process, the garment models may be deformed such that the outline is self-overlapping. In this case, it is advantageous that the topology of the front-facing surface is given by a mesh. This will usually be readily present, e.g., for texturing purposes, but can also be reproduced from a polygonal curve using known methods, like for example described above in conjunction with step S10.

2D garment models are considered to represent the garment as seen from the front, i.e., there is no front or back side of the model.

Figure 4:
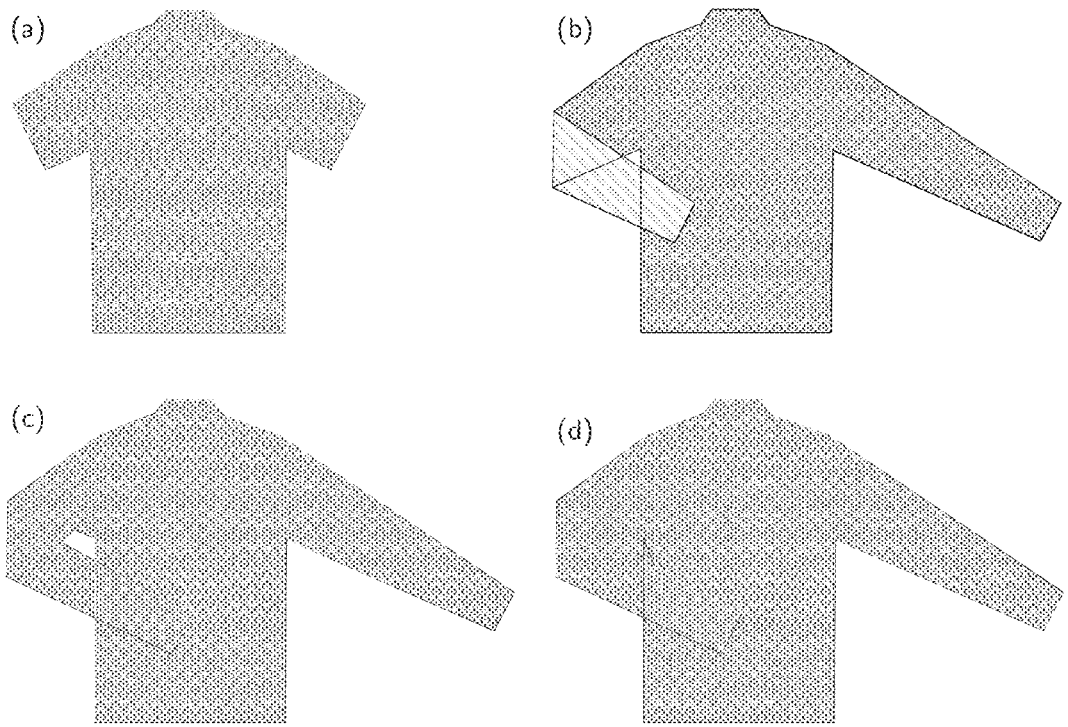
FIG. 4 shows examples of self-intersections of garment models.

It is now referred to FIG. 4. When no front-facing parts of the garment are covered by other parts, the outline corresponds to the boundary of the rendered shape. Then, the outline is not self-intersecting, as for example shown in the upper left portion (a) of FIG. 4. However, depending on the pose of the avatar, the outline may be self-intersecting, e.g., when the sleeves of a shirt cover parts of its waist, like for example shown in portions (b), (c) and (d) of FIG. 4. The method can handle such intersections as long as the outline can be obtained from a projection of the single boundary of a 3D mesh in which all triangles are front-facing, i.e., face the plane they are projected on, like for example shown in portions (c) and (d) of FIG. 4. Portion (b) is not completely front-facing.

A similar concept is known as "self-overlapping polygons". Self-overlapping polygons can be triangulated such that each diagonal emanates to the interior of the outline (where the side of the outline is given by its traversal). That is, every self-overlapping polygon is front-facing. An algorithm to both test this property and to create a triangular mesh when only the outline is given is known. Such a triangulated polygonal chain can therefore serve as the input for the method. In any case, the method prefers the outline to be accompanied by a mesh.

The mesh of the shape maintains the topological information required by the method. For instance, each edge in the mesh has exactly one triangle on each side, or one triangle if it belongs to the outline. The outline can be traversed such that all triangles of the mesh are on the same side, and there is only a single such traversal. Less formally, the mesh can be obtained from a 3D surface mesh with a single boundary in which all triangles are front-facing.

In addition to the topological information, the mesh may carry information for texturing. In particular, for garment models, the mesh will have vertices not only on the outline but also in the interior of the shape. The positions of these interior vertices usually depend on the vertices of the outline in a non-linear way.

This representation may be used in the fitting process, i.e. when aligning the garment model to the avatar, as it allows for altering the outline while keeping the structure of the mesh consistent. The same effect keeps the mesh and thus the texture map consistent when removing overlaps by the method.

Three-dimensional models e.g. comprise a mesh of interior-disjoint triangles that define a single surface. Depending on the system, the mesh is either watertight, or it may contain boundaries consisting of edges that are the side of only one triangle. These boundaries define the openings of the garments, e.g. collars, lapels and sleeve ends. As there exist standard methods to add triangles to the mesh in order to make it watertight, it can be assumed that the input is provided in this way. Openings are thus connected sets of triangles on the model surface that are marked accordingly. In case openings do not correspond to triangles in the mesh, the mesh can be subdivided to achieve this property.

As the models may come from a fitting process, their vertices may be represented in a format that facilitates mesh editing. For example, so-called differential mesh representations exist, where altering the position of a vertex affects the positions of the neighboring ones in a way that is desirable for garment representation. The method provides the flexibility to use such formats for improving the final presentation.

Referring back to FIG. 3, for potential preprocessing, the fitting step S12 is the procedure of aligning the garment model(s) to the avatar, respecting both the shape and the pose of the human model. There are various known fitting methods both for 2D and 3D garments. While in the 2D fitting process self-overlapping outlines can occur due to the pose of the avatar, e.g., when the hand is in front of the waist, it can be assumed that the fitting process in 3D does not change the topological structure of the garment model. In case such overlaps occur, they can be corrected by mesh repair algorithms or a human operator.

Both 2D and 3D garment models can have semantic labels D14 that, e.g., indicate to which part of the garment a face of the mesh belongs. This additional information can be used to improve automated results.

In the following main aspects of the method are described. Generally speaking, first, a garment model is tested, e.g. in step S35, and adjusted, e.g. in steps S40 and S45, for undesired overlapping against all other models, e.g. in the hierarchy above it. During each such test, the volume or area taken by the garment model decreases, so it is not strictly necessary to constrain the order in which these tests are performed for a given garment. For example, when processing the garment models from outside to inside, each model is, in general, altered only once.

Variants of the methods are described where the size of the garment models increases, or in which both models that are tested against each other are modified. The processing order can then be from inside to outside, or arbitrary until a fixed point is reached, e.g. there is no significant change any more, respectively. As a second, optional phase, the avatar is tested against the resulting garment model, triggering a less constrained overlap correction process, e.g. in step S50.

For the process of actual overlap correction, at least one opening object for at least the outer garment GA is stored as garment opening objects D20. Generally, garment opening objects can be stored for all garments of the set of garments. Each opening object is defined as a portion of the respective limiting object of the garment and constitutes a transition for an item, e.g. garment or avatar, between the interior and the exterior of the respective garment.

Figure 5:
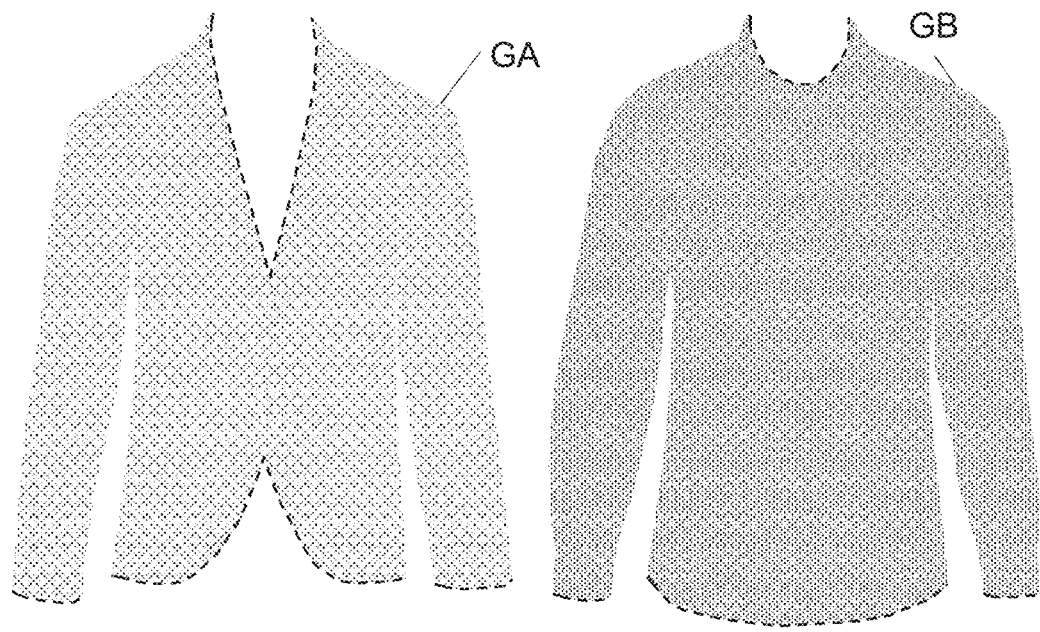
FIG. 5 shows example representations of garments with annotated openings.

Referring now to FIG. 5, the opening objects of the two garments GA, GB are indicated with dashed lines, e.g. for sleeves, neckline or seams. These openings particularly define the parts of the garment outline, along which the underlying garment can become visible. In the two-dimensional case, each opening object of a respective garment is a portion of the continuous outline of the respective mesh, for example.

Referring back to FIG. 3, the opening objects may be determined in an opening determination step S20 that can be part of the process or can be executed before the actual process, such that the garment opening objects D20 are available to the processing method.

For example, the at least one opening object can be determined based on a determination of intersections with an avatar or body model, e.g. the avatar model data D12. As an alternative, a standard body model can be used for this purpose. It may, for example, be the case that the garment model is fitted to a generic avatar, which may not have the pose of the actual avatar AV that is the input to the system.

In the 2D case, the method may identify intersections of an outline of the avatar and the outline of the garment model. When doing this process before the fitting procedure, the outlines can be considered to have no self-intersections, e.g. are simply polygonal curves. However, a more sophisticated procedure for finding intersections of front-facing outlines can be applied, as will be described later in more detail in conjunction with step S35. For example, each part of the model outline in the interior of the avatar outline is marked as an opening. In addition or as an alternative, semantic information, e.g. as provided from semantic labels D14, e.g. an outline between the legs of the avatar, is also marked as an opening, e.g. by identifying parts of the garment model as the lower part of a skirt as a semantic information. In some configurations it may be expedient to extend the individual openings to reflect the actual opening of the model. Several alternatives are available for such extensions.

For example, a heuristic can be applied that incrementally extends the opening to neighboring edges along the garment model outline, until the outline makes a sharp turn, e.g. a turn that is larger than an angle given as a parameter, or a part with a different semantic label is reached. Depending on the input data, sharp turns may also appear in the relative interior of openings. For such data, the method may apply e.g. algorithms for smoothing polygons. A sharp turn in the potentially smoothed outline is then considered as an end point of the opening.

In addition or as an alternative, extensions of the openings may be achieved by a machine learning algorithm and/or a human operator that determines the semantic labels D14 of the garment. For example, such semantic labels identify the parts of the garment model, e.g. a collar or a sleeve, and this information can be used for a precise identification of the opening edges or end points.

The results of this processing are the garment opening objects D20 in the openings of the garment model along the outline.

In step S35 the intersection objects for each of the garments, e.g. the first and the second garment GA, GB are determined. These intersection objects define one or more intersection between the limiting objects of the first and the second garment. In a two-dimensional case, each intersection object of a respective garment is an intersection point of the respective mesh, e.g. of the continuous outline. In other words, intersection objects of a two-dimensional garment model are points where the outlines of the garment models cross each other.

Referring now to step S30 in FIG. 3, the procedure of finding a sequence of intersections of the outlines, which will be described in more detail in conjunction with step S35, requires a point on the outline of the inner garment model, and a triangle T in the mesh of the outer garment such that the point is covered by the triangle T. This can be a non-trivial task that may require domain knowledge, as such a point can be geometrically contained in several triangles of the mesh of the outer garment.

Figure 6:
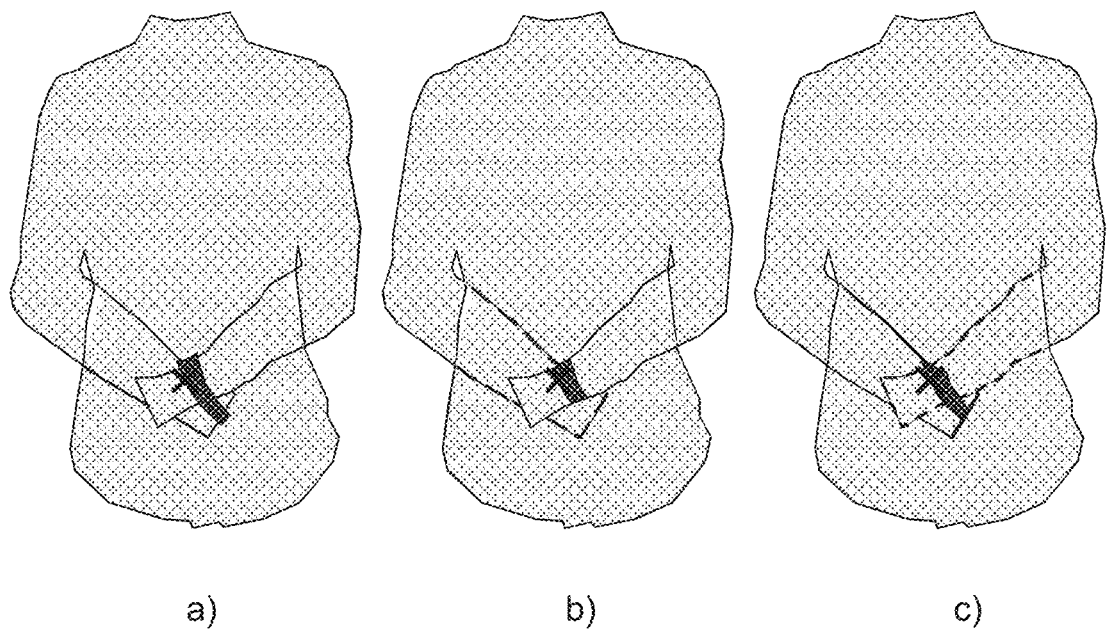
FIG. 6 shows example representations of combined garments.

Referring now to FIG. 6, an example of such ambiguity is given. In the three examples, a), b), c) the two garments are a shirt and a wristband worn below the shirt. The point on the outline of the wristband, marked by a cross, is, geometrically, inside three triangles: one for each arm and one for the waist of the shirt. Depending on which of these triangles is chosen, the wristband is considered to be on the left arm, example b), or the right arm, example c). Choosing the triangle in the waist of the shirt is technically incorrect anyway, as shown in example a).

The correct triangle can be identified, e.g. by the use of machine learning tools, thereby using domain knowledge based on the types of garment models. Another alternative is to run the actual determination of intersection objects S35 once for each choice of a starting triangle, and to pick the desired result due to desired properties like minimal area of parts removed from the model or the like.

Furthermore, if the garment models also have semantic information, e.g. semantic labels D14, relating garment parts to parts of the body model, this information can be used to identify the correct triangle for a given starting point, e.g. the triangle and the point belong to the same body part. Theoretically, the identification of the correct triangle can also be made by a human operator. In any case, a starting point and its triangle position are given as input D30 for step S35. In the example of FIG. 6, the outline of the wristband is altered according to the respective choice.

Referring now to step S35 in FIG. 3, it is assumed that the meshes associated with the first and the second garment are formed at least by a plurality of points or vertices and by a plurality of faces or triangles in connection with the points or vertices. As described before, one of the plurality of points or vertices on the limiting object of the inner garment, e.g. the outline of the inner garment, is selected in the interior of the outer garment as a starting point. Determining the intersection object, step S35, comprises traversing from the starting point on the limiting object, e.g. outline, of the inner garment until the limiting object of the outer garment is crossed, thereby determining at least one intersection point of the intersection objects, e.g. the first intersection point.

Figure 7A:
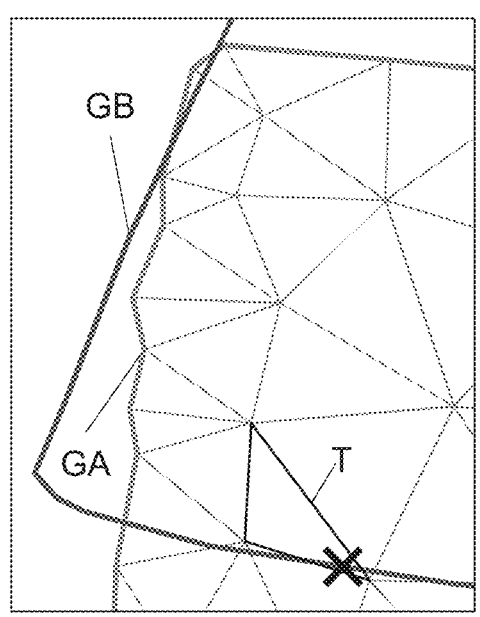
FIGS. 7A to 7F show example steps in the process of determining intersections between garments.

Referring now to FIG. 7 and example process steps depicted in FIGS. 7A to 7F the procedure starts on the point of the outline of the inner garment GB inside a given triangle T of the mesh of the outer garment GA as provided in D30 and as shown in FIG. 7A. The starting point on the outline of garment model GB is marked with a cross.

Figure 7B:
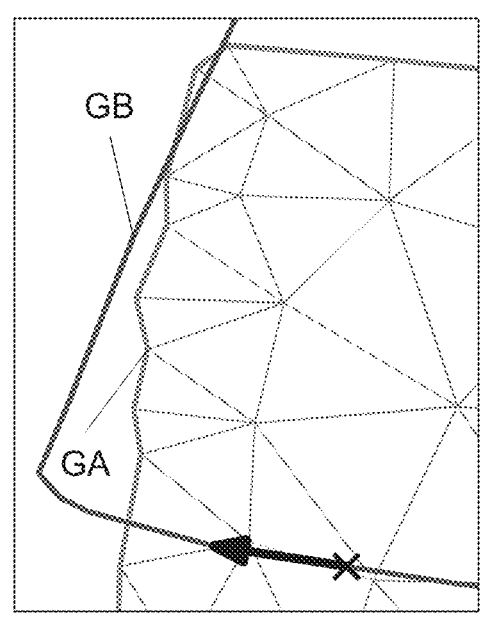
Figure 7C:
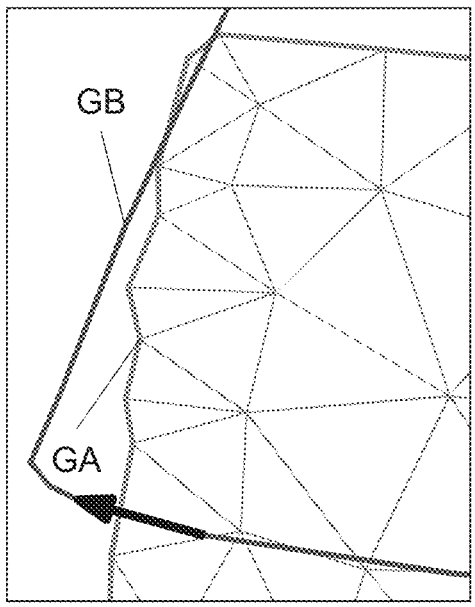
Figure 7D:
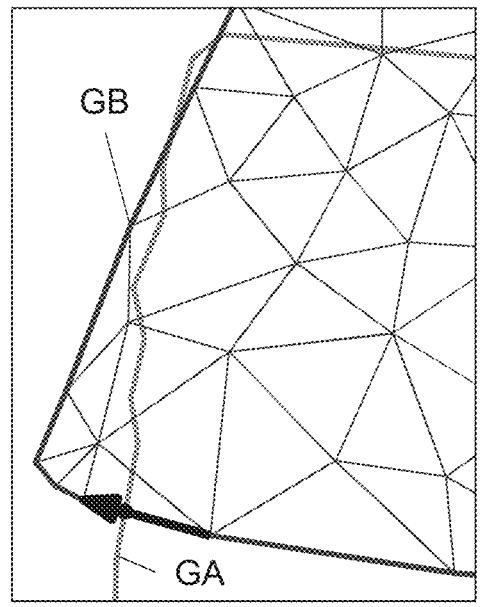

The procedure processes the edges of garment GB in the order in which they appear along the outline of garment GB, starting in the point. In less algorithmic terms, this corresponds to a walk along the outline of garment GB, starting inside the triangle T. Such a walk is, for example, indicated in FIG. 7B. The procedure determines the point at which the outline of garment GB leaves the respective triangle. If this point is part of the outline of garment GA, the procedure has found an intersection point which it stores. In the example of FIG. 7B, although the starting triangle is left, the outline of garment GB is not yet met such that the procedure continues its search for an intersection point along the outline of garment GB. This, for example, is achieved in the example steps of FIG. 7C, where the outline of garment GA is crossed and FIG. 7D, where the intersection point on the outline of garment GA is defined and stored.

Figure 7E:
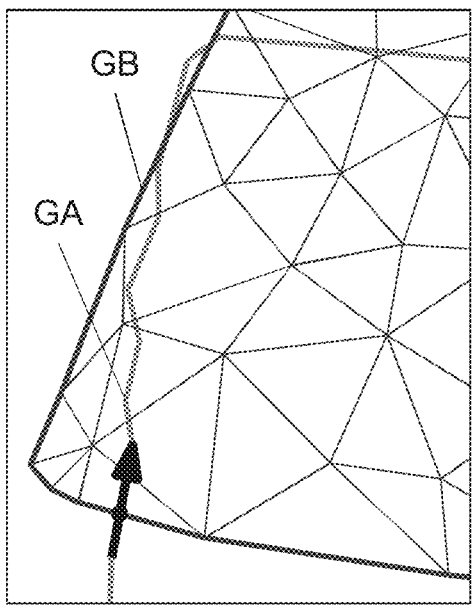
Figure 7F:
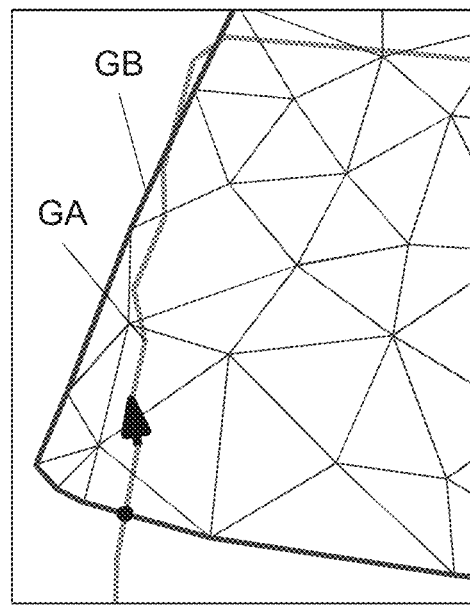

At such an intersection point, the outline of garment GB leaves the interior of garment GA. This, on the other hand, means that the outline of the garment GA enters the interior of garment GB by entering the interior of a triangle of the mesh of garment GB as shown in FIG. 7E, e.g. through the relative interior of an edge of the mesh of garment GB. As before in the walk along the outline of garment GB, the procedure considers the edges of the outline of garment GA and the elements of the mesh GB containing them. By iteratively traversing these elements, as for example shown in FIG. 7F, an intersection of the two outlines can be found. That is, in the present example, where the outline of garment GB so to say re-enters the garment GA. This re-entering point is also stored in a sequence of intersection points. For example, the procedure continues by walking the outline of garment GB and the mesh of garment GA, as before. The procedure stops as soon as the initial edge of garment GB and the triangle T in the mesh of garment GA are reached again Generally speaking, for example, determining the sequence of intersection objects further comprises traversing from the first intersection point on the limiting object, e.g. outline, of the outer garment until the limiting object of the inner garment is crossed, thereby determining at least one further intersection point of the intersection objects, e.g. a second intersection point. From there, the procedure continues like during the determination of the first and second intersection point, i.e. traversing from the second intersection point on the limiting object, e.g. outline, of the inner garment until the limiting object of the outer garment is crossed, thereby determining at least one further intersection point of the intersection objects, e.g. a third intersection point etc.

It may be necessary for the procedure to consider special cases like infinite intersection points when two edges of garments GA and GB are aligned, or edges of one outline pass through vertices of the other mesh. However, these cases can be handled either directly, or e.g. by using standard symbolic perturbation techniques.

In the end, the above procedure leaves us with a sequence of intersections, respectively intersection objects D35, in which the inner garments GB outline leaves and enters the garment GA in alternation. Further, for each intersection point or intersection object, the procedure may store whether it is on an opening object of the outer garment GA or not.

As part of the next step S50, the intersection sequence is inspected. Based on the type of the intersection points respectively intersection objects, and the positions of the opening objects, the geometry data of the garment models is adapted. Let P and Q be two consecutive intersection points of the sequence, i.e., the outline of inner garment GB leaves the outer garment GA at P and enters again at Q. The procedure distinguishes the following cases, as sketched in FIG. 8.

Figure 8A:
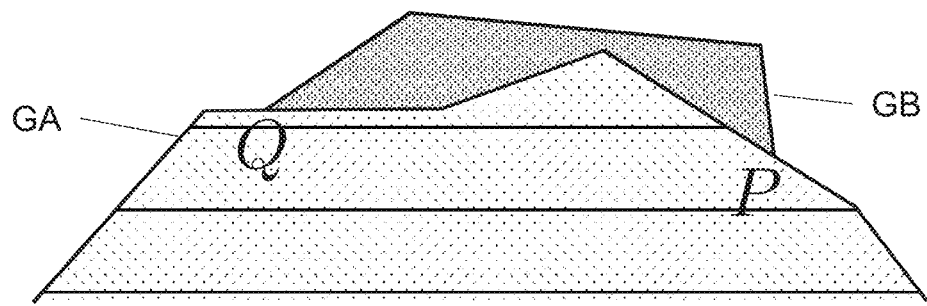
FIGS. 8A to 8D show several configurations of overlapping garment parts.

FIG. 8A: There is no opening object on the outer garment GA between intersection points P and Q.

Figure 8B:
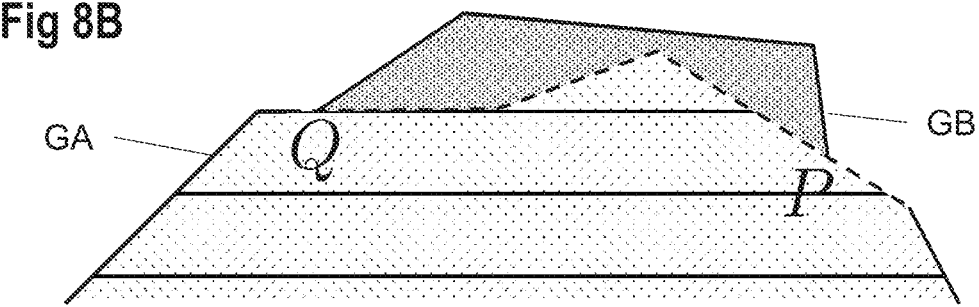

FIG. 8B: Intersection points P and Q belong to the same opening object.

Figure 8C:
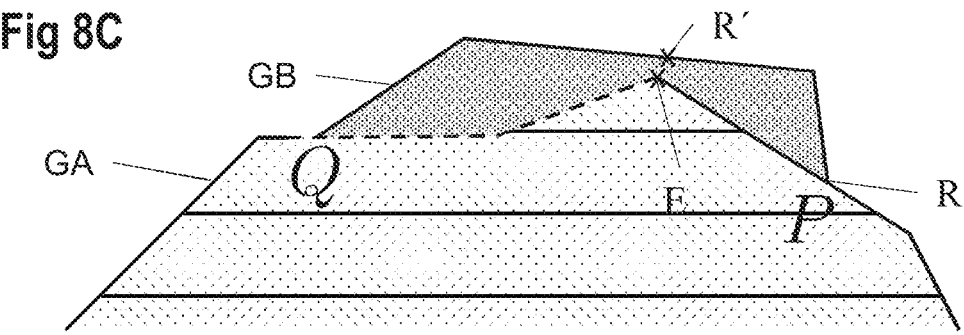

FIG. 8C: Intersection point P is not at an opening object, but Q is on an opening object following P along the outline of the outer garment GA (or the roles of P and Q are altered), i.e., there is exactly one endpoint of an opening object between intersection points P and Q.

Figure 8D:
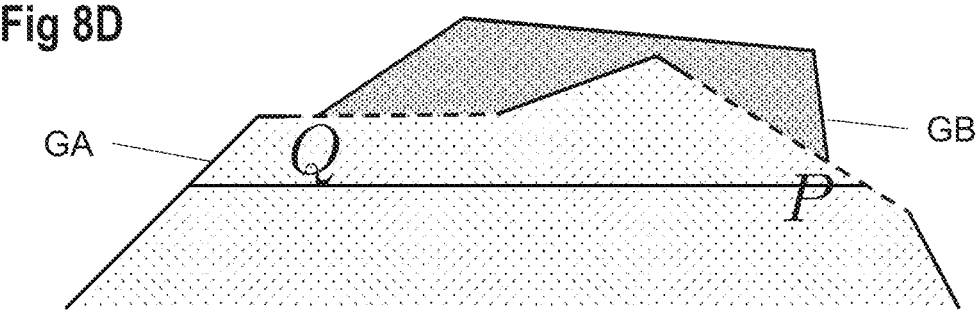

FIG. 8D: There are multiple endpoints of opening objects between intersection points P and Q.

The intersection objects or intersection points, respectively, define respective overlap section objects for each garment. These are the objects, as well in the two-dimensional case as in the three-dimensional case described later, where adjustments potentially take place.

For example, each overlap section object of a respective garment is a portion of the continuous outline of the respective mesh bounded by two of the intersection points of the respective garment, e.g. where the continuous outline of the inner garment leaves and re-enters the interior of the outer garment With respect to the different cases described above in conjunction with FIGS. 8A to 8D, for example, adjusting the geometry data of the first and/or the second garment is based on one of the following configurations being detected:

E) the respective overlap section object of the outer garment comprises no opening object of the outer garment;

F) the respective overlap section object of the outer garment in full comprises one of the at least one opening objects of the outer garment, at least partially;

G) only a part of the respective overlap section object comprises one of the at least one opening objects of the outer garment, at least partially;

H) the respective overlap section object of the outer garment comprises two or more of the at least one opening objects of the outer garment, at least partially.

There are various options for handling detected overlaps. They partly depend on the way the mesh data of the garment model is represented, and on whether there is additional physics data for the model.

For example, for case A as sketched in FIG. 8A, if there is no opening object on the outline of the outer garment between the two intersection points P and Q, adjusting the geometry data of the first and/or the second garment comprises adjusting the complete portion of the outline of the inner garment and/or the outer garment bounded by the two intersection points P and Q.

For example, for case B as sketched in FIG. 8B, if the two intersection points P and Q are both comprised by the same opening object on the outline of the outer garment, adjusting the geometry data of the first and/or the second garment comprises leaving the complete portion of the outline of the inner garment and the outer garment bounded by the two intersection points P and Q without adjustments.

For example, for case C as sketched in FIG. 8C, if one point R of the two intersection points P and Q is not comprised by an opening object on the outline of the outer garment and there is one endpoint E of an opening object on the portion of the outline of the outer garment bounded by the two intersection points P and Q, adjusting the geometry data of the first and/or the second garment comprises determining an outline point R' on the outline of the inner garment GB in the vicinity of the endpoint E, and adjusting a portion of the outline of the inner garment GB bounded by the point R and the outline point R' and/or a portion of the outline of the outer garment GA bounded by the point R and the endpoint E.

For example, for case D as sketched in FIG. 8D, if there is a sequence S of endpoints of at least one opening object on the portion of the outline of the outer garment bounded by the two intersection points P and Q, adjusting the geometry data of the first and/or the second garment comprises determining a sequence S' of outline points on the outline of the inner garment, each of the outline points of the sequence S' being in the vicinity of a corresponding endpoint of the sequence S, and adjusting such portions of the outline of the inner garment that are bounded by two of the outline points of the sequence S' and that are not associated with an opening object and/or such portions of the outline of the outer garment that are bounded by two of the endpoints of the sequence S and that do not comprise an opening object.

In all cases A to D, adjusting an outline and/or a portion of an outline may comprise adjusting points or vertices associated with the respective outline and points or vertices in their vicinity. These points may be found in step S45, for example.

The approaches discussed below can be classified by the way they alter the outline:

Parts of an outline are replaced by parts of the other. The most basic case is the one where the outline of the inner garment model GB is altered. In an alternative variant, the outline of the outer garment model GA is altered to hide the undesired parts of inner garment GB.

The vertices of a mesh are moved to change the overlap, e.g., using 2D shape deformation. Again, both variants of altering inner garment GB or the outer garment GA are possible. In order to achieve a realistic visual representation, it may be desirable to not only move the vertices that produce the overlap, but also vertices in their vicinity. This can, e.g., be achieved by vertex representations in which the coordinates of a vertex are constrained by its neighboring vertices, e.g., using Laplacian coordinates, as described above; in such a representation, moving the vertices that produce the overlap results also in the movement of other vertices, and usually results in smooth deformations of the outline. This may be relevant if the outer garment is transparent, but also in particular in the cases that involve openings. For the latter, vertices that are visible due to the opening may be moved as well.

Both outlines are altered, e.g., in accordance with physics data.

Parts of one model are hidden, e.g. using a mask or an alpha mapping.

Only the parts of the underlying, inner model that become visible through the openings is kept, and used for rendering. In this variant, the method keeps a set of disconnected garment parts that are rendered.

The variants of the method to correct the overlaps are described in the following with respect to the different cases A to D and with respect to the different approaches a) to e) described above. The overlaps are processed, e.g., incrementally.

Case A, FIG. 8A:

When altering inner garment GB, it adds P and Q as vertices of inner garment GB, and replaces the outline of inner garment GB between P and Q by the part of the outline of the outer garment GA. In the variant where the outline of the outer garment GA is altered, P and Q are added as vertices of the outer garment GA and the outline of the outer garment GA is altered analogously.

The variant that alters inner garment GB is described. Optionally add points P and Q, or points close to them in the interior of the outer garment GA, as vertices to the outline of inner garment GB. For all vertices of the outline of the inner garment GB between P and Q, the method finds a corresponding point on the outline of the outer garment GA or in the interior of the outer garment GA close to the outline, e.g., by minimizing an optimization criterion. These points can be called correspondence points.

It should be noted that merely selecting the points with the shortest distance may lead to a different order of the corresponding points along the outline. An alternative to using optimization algorithms is to select, for each vertex, the geodesically closest point, with the geodesic being outside the inner garment GB and inside the outer garment GA.

Figure 9:
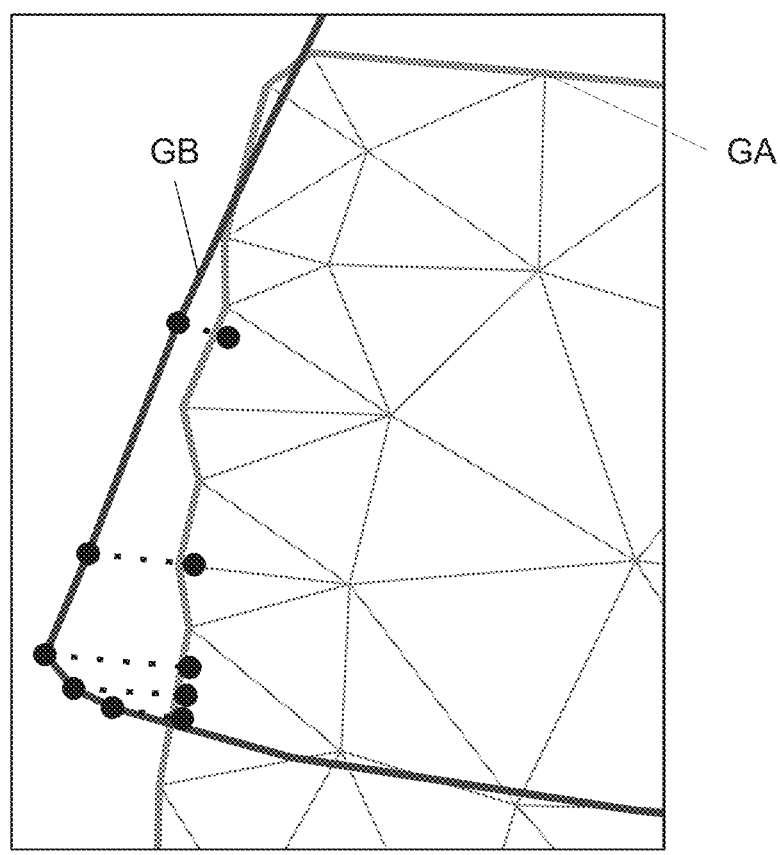
FIG. 9 shows an example representation of adjustment of geometry data.

The vertices of the outline of inner garment GB are moved to these points. The points where the vertices of the inner garment GB are moved to can be chosen slightly inside the outline of the outer garment GA, as for example shown in FIG. 9. Again, the roles of the outer garment GA and inner garment GB can be interchanged when the outer garment GA is expanded to remove the overlap.

Depending on the structure of the outline of the outer garment GA, this may not be sufficient to remove the overlap: there could be a vertex of the outer garment GA between two vertices of inner garment GB such that the outline of inner garment GB cannot be moved inside the outer garment GA. Therefore, the method finds, for the part between P and Q, a sequence of points on the outline of inner garment GB that correspond to vertices of the outer garment GA. The edges of inner garment GB are subdivided at those points. Now, for each vertex of the outer garment GA there is a corresponding vertex of the inner garment GB in the relevant region, and all the vertices of the inner garment GB, e.g. the original ones and the newly created ones, in that part are moved to their counterparts on the outer garment GA.

Optionally add P and Q or points close to them as vertices to the outline of garments GA and GB. Define a curve between P and Q that is intended to separate the resulting garments. Either replace the parts of the outlines of garments GA and GB by the curve, similar to a), or move the vertices of the outlines to the curve, similar to b).

The curve between the outlines can be found in various ways: For instance, the method may use non-linear optimization procedures, respecting optionally modeled properties of the material, or intermediate stages when morphing one chain to the other; another option is to use the geodesically shortest path between P and Q inside inner garment GB and outside the outer garment GA; another approach that allows for continuously choosing the similarity of the curve to the part of A and B, one may use, say, a point with weighted distance on the geodesics defining the geodesic Fréchet distance between the two curves.

Set the mask/alpha mapping such that the overlapping region is not rendered. This region is bounded by the outline of inner garment GB between P and Q, as well as of the outline of the outer garment GA between Q and P.

The method does not add anything to the set of model parts to render.

Case B, FIG. 8B:

If P and Q belong to the same opening, then, for approaches a), b), c), and d), the outline of the models is not altered. It is possible that the part of inner garment GB leaving through the opening re-enters the outer garment GA. For example, the neck part of a shirt leaves the neck opening of a jacket, and the shirt's collar then overlaps with the jacket again. However, such overlaps usually do not lead to unnatural representations, and can be handled, e.g., by an appropriate order in which the garment models are rendered.

For approach e), the method stores a part of model B for rendering in the following way. The outline of the part consists of the outline of inner garment GB between P and Q, as well as of the outline of the outer garment GA between Q and P.

Figure 10A:
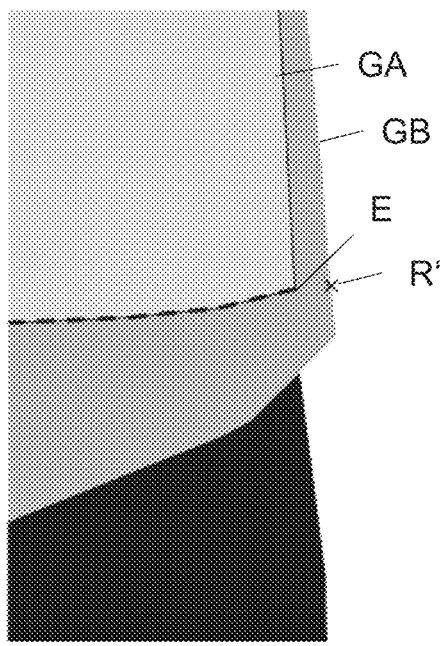
FIGS. 10A and 10B show example details of an adjustment of geometry data of garments before and after the adjustment.
Figure 10B:
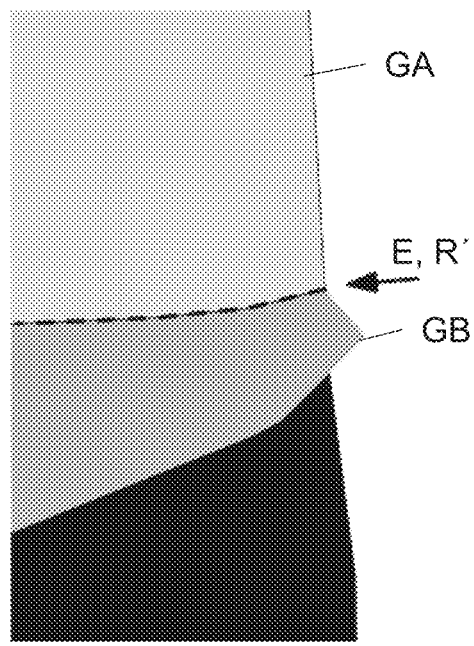

Case C, FIG. 8C:

Referring to FIG. 10A and FIG. 10B, the method identifies an outline point R' that is moved to the beginning of the opening, i.e. endpoint E, e.g., by using the following heuristic: The outline of inner garment GB is traversed, keeping track of the distance to the beginning E of the opening. If the current distance exceeds the current minimum distance by a given factor, the current minimum point is used as the outline point R' at the beginning E of the opening. This heuristic e.g. allows for overcoming local minima, as well as disregarding a global minimum that is not the desired point.

The method now proceeds depending on the chosen option.

Suppose first inner garment GB is modified. In this case, the outline vertices of inner garment GB must be altered such that the outline continues inside the outer garment GA until it leaves the outer garment GA at the opening, as shown in FIG. 10A and FIG. 10B, respectively. The method replaces the outline of inner garment GB from P respectively R (not visible in FIG. 10A and FIG. 10B) to R' by the outline part of the outer garment GA from P respectively R to the beginning E of the opening. That is, the inner garment GB has the first point E of the opening as a vertex, and the next vertex is the one after R' along the outline of inner garment GB. In particular in models where the next vertex on inner garment GB is far away from the point R', this method may lead to effects that are not perceived as natural garment behavior. Approach b) described below can lead to improved results.

In case the outline of the outer garment GA is modified, the method proceeds similarly. After finding the point R', the outline part of the outer garment GA from P respectively R to the beginning E of the opening is replaced by the one of inner garment GB between P respectively R and R'.

If the vertices of the outline of inner garment GB are to be moved, the method finds points along the outline of the outer garment GA between P respectively R and the opening endpoint E and maps the vertices on the outline of inner garment GB between P respectively R and R' to these points (similar to the first case A), in particular mapping R' to the beginning E of the opening or a point in its vicinity. For cases in which the next vertex on B is far away from R', the method can be adapted by making vertices of the inner garment GB in the vicinity of the point dependent on a non-linear optimization system as used for the interior vertices of the mesh.

For altering the outer garment GA, we can use the analogous mapping of vertices of the outline of the outer garment GA between P respectively R and the opening endpoint E to points on the outline of inner garment GB between P respectively R and R'. In this case, it may also be desirable to optionally alter the vertices of the opening close to the first vertex, e.g., using a non-linear optimization system.

When altering both garment models GA, GB, the method computes a point where both the beginning E of the opening and the point R' are mapped to. This point can, e.g., be found by a linear interpolation, with factors depending on the material properties. After this point is found, a curve between P respectively R and this point is constructed as in the first case, and the outlines are modified respecting this curve.

For applying a mask or alpha mapping, the boundary of the part that should not be rendered needs to be defined. This can be done in the same way as in approach a), i.e., by an edge between the beginning E of the opening and the vertex on the outline of inner garment GB following P respectively R.

For this approach, the outline of the part of inner garment GB that is rendered can be obtained similar to approach a). Thus, the part is defined by an outline starting at P respectively R followed by R' until Q, and then by the outline of the outer garment GA along the opening from Q to P.

Case D, FIG. 8D:

In this case D, the method considers the sequence S of endpoints of openings along the outline of the outer garment GA between P and Q. The method determines a sequence S' of points on the outline of inner garment GB such that these points correspond pairwise to the points of S, such that the distances between corresponding points minimize an optimization criterion, e.g. sum of squares. After this correspondence has been determined, the method can resolve overlaps according to the different approaches.

If the inner garment GB is altered, then the outline of inner garment GB is subdivided by the points in S'. Then, these vertices are placed at the endpoints S on the outer garment GA. After this procedure, the previous cases apply. If at least one of P and Q, say, P, is not at an opening, the method may optionally also apply the heuristic described for Case C for the point R' before finding the set S. Similarly, when the outer garment GA is altered, the end-vertices in S are placed at their counterparts in S'.

Similar to approach a), the vertices of inner garment GB or the outer garment GA are moved to the corresponding points of S or S', respectively. As in Case C, vertices in the vicinity of the moved vertices can be made non-linearly dependent on their neighboring vertices; this will, in general, result in a smoother representation of the outline.

As in Case A, the method relies on determining a curve that is in-between the points P and Q and matches the criteria of an optionally imposed physics model. The method can sub-divide inner garment GB at the points in S', and methods such as morphing or non-linear optimization provide such a curve with vertices corresponding to the points in S and S'.

Again, the boundary of the alpha mapping needs to be defined, which can be done as for approach a).

This step, in general, results in several model parts that are added to the set of parts to be rendered. As already in the previous case, the outline of these parts can be defined as in approach a).

When applying these steps iteratively on the garment models, they get modified such that eventually one ends up with an adequately re-shaped or adjusted garment D40. While it may happen that this procedure produces a model that is no longer front-facing, this does not influence the correctness of the method, as the property of being front-facing is relevant only for finding the intersection objects.

While the process of adjusting garments according to improved processing concept has been described for a set of two garments so far, the set may further comprise a third or even more garments, as indicated above. Generally, the same procedures may apply between the third garment and the other garments.

For example, the process may further comprise storing, in the computer system, third model data of a third garment of the set, the third model data comprising two-dimensional or three-dimensional geometry data defining a mesh associated with the third garment, wherein a limiting object of the third garment is defined by at least a portion of the geometry data and constitutes a separation between an interior and an exterior of the third garment. At least one opening object for the third garment is stored in the computer system, each opening object defined as a portion of the limiting object of the third garment and constituting a transition for an item, e.g. garment or avatar, between the interior and the exterior of the third garment. The method further comprises determining, in the computer system, intersection objects for the third garment, the intersection objects defining one or more intersections between the limiting object of the third garment and the limiting object of one of the first and the second garment.

For each of the respective garments, portions of the limiting objects are determined in the computer system as overlap section objects bounded by one or more of the intersection objects of the respective garment. Finally, the geometry data of the respective garments with respect to the overlap section objects are adjusted.

Hence, a set of adjusted garments D40 results.

With respect to step S50 in FIG. 3, there may be a need that also the avatar AV must be adapted to the altered garment outlines or vice versa, in order to cover cases in which parts of the avatar AV would leave the region of the garment(s) not at an opening. Such overlaps may appear even after a fitting process, as such methods may be heuristics based only on control points. This procedure is similar to having the avatar AV as the outline of an inner garment. Here, particularly the cases in which the avatar outline leaves and enters within a connected opening or non-opening part of the garment outline are handled by the method.

It should be considered that moving the outline points of the avatar towards endpoints of the openings may lead to a distortion of the avatar in the vicinity of this region; while such distortion is acceptable for garments, for human models this is perceived as highly unnatural by human viewers.

For example, avatar model data of an avatar, on which the garments of the set are worn, are stored in the computer system. The avatar data may comprise two-dimensional or three-dimensional geometry data defining a mesh associated with the avatar. A limiting object of the avatar is defined by at least a portion of the geometry data and constitutes a separation between an interior and an exterior of the avatar.

Similar as described previously for the garment models, intersection objects for the avatar and for an innermost garment of the set are determined in the computer system. The intersection objects define one or more intersections between the limiting object of the avatar and the limiting object of the innermost garment.

The procedure may further comprise determining, in the computer system, for the avatar and the innermost garment, portions of the limiting objects as overlap section objects bounded by one or more of the intersection objects of the avatar and the garment, and adjusting, in the computer system, the geometry data of the avatar and/or the innermost garment with respect to the respective overlap section objects.

Instead or in addition to the innermost garment, the same procedure can also be applied with respect to the other garments worn above the innermost garment. For example, the procedure can be performed iteratively until no undesired intersections between the avatar and any of the garments remain.

For this optional step S50, the avatar model can either be altered as done with the garment model before, or the non-overlapped outline of the avatar as well as the outline of the garment for the overlapping part can be used, e.g., to define the outline of a mask used when rendering the avatar AV.

Referring back to FIG. 3, with the adjusted set of garments D40 and, optionally, the adjusted avatar model D50, or the avatar D12, a combined presentation of garment models on the avatar can be achieved in step S60.

In contrast to 2D models, where self-intersections of a garment outline are a reasonable representation due to projection, 3D garment models are considered to be intersection-free and resemble common 3D models as created, e.g., using CAD. This has the effect that point containment algorithms can be used to determine which parts of garment model GB are outside of the garment model GA. Also, it can be assumed that these steps provide the opening object(s).

A key element addressed by the method according to the improved processing concept is how to determine whether these parts have to be removed or not, and how the intersections with garment openings are handled. For handling the detected overlaps, the method can use generalizations of all variants for the 2D case as described above, except for variant e).

For instance, in the three-dimensional setting, the models should allow the user to see through the openings, and thus there is, in general, no clear separation between the visible and invisible parts of the inner garment model.

The handling of limiting objects, opening objects, intersection objects and overlap section objects generally follows the same rules as for the two dimensional case. However, due to the different geometric representation, the meaning of those terms is slightly different.

For example, each limiting object of a respective garment is a surface of the respective mesh, each opening object of a respective garment is a portion of the surface or a boundary of the surface of the respective mesh. Each intersection object of a respective garment may be a cycle of intersection points of the respective mesh, e.g. of the surface. Each overlap section object of a respective garment is a portion of the surface of the respective mesh bounded by at least one of the cycles of intersection points of the respective garment.

Referring back to FIG. 3, in particular to optional step S20 regarding the determination of openings, resulting in the respective garment opening objects D20, this may be accomplished similar as in the two-dimensional case. For example, the openings can be determined based on intersections with an avatar and/or with the use of semantic labels D14 and/or the use of machine learning algorithms. For the determination of intersections objects S35, a starting point and triangle position D30 is required.

As in the two-dimensional case, the method starts by selecting a point on the inner garment GB in the interior of the outer garment GA. Again, the choice of this point is the basis for the method to yield satisfying results, and is domain-specific; the options given for the two-dimensional case apply here as well.

Figure 11:
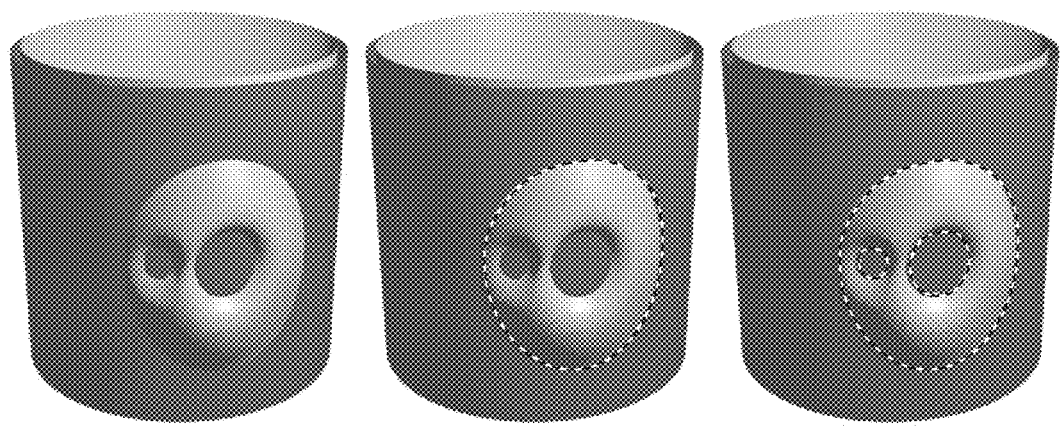
FIG. 11 shows examples of intersections of three-dimensional models.
Figure 12:
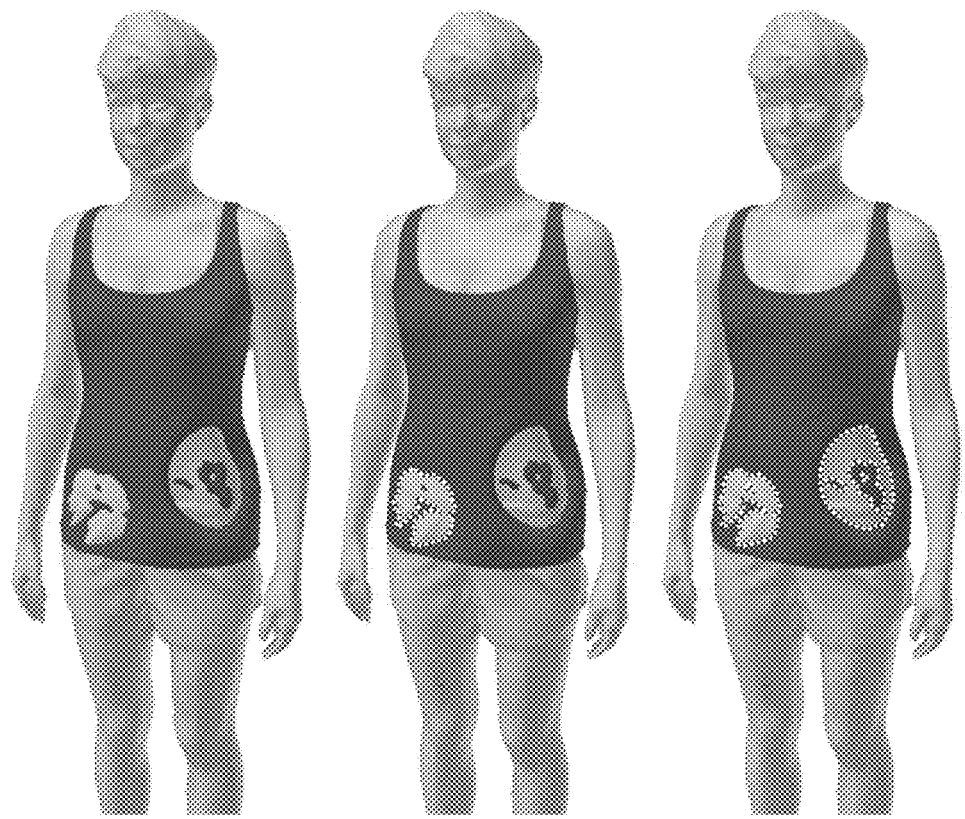
FIG. 12 shows example representations for a determination of intersections between garment models.

FIG. 11 and FIG. 12 show representations of 3D models with a light-shaded inner model and a dark-shaded outer model before processing, i.e. where parts of the inner model overlap with the outer model in a technically incorrect way.

Starting e.g. from FIG. 11 and FIG. 12, left images, respectively, and using, e.g., breadth-first-search on the mesh structure of the inner garment GB, the procedure finds an intersection point where the inner garment GB leaves the outer garment GA, i.e., a point such that in any neighborhood around it a point of inner garment GB is outside the outer garment GA. Any such point is actually part of a cycle defined by such points. It should be noted that the procedure may choose to not handle intersection points where the inner garment GB does not leave the outer garment GA. examples of such cycles are shown in FIG. 11 and FIG. 12, middle images, respectively.

The procedure determines all these points by processing the elements of the meshes of garments GA and GB. The elements are processed in the order in which they appear along such a cycle. The output e.g. is a closed non-self-intersecting polygonal cycle on the surface of both garments GA and GB, locally separating the parts of inner garment GB inside and outside of the outer garment GA.

Analogously to the two-dimensional case, the procedure now picks a triangle of the outer garment GA adjacent to the curve that is inside the inner garment GB and searches for a point at which the outer garment GA leaves the inner garment GB. Alternatively, the method may continue the search on the inner garment GB inside the region defined by the cycle for intersections with the outer garment GA. As before, the non-self-intersecting polygonal cycle on the two meshes of such points is constructed. This can be seen in FIGS. 11 and 12, right images, were it can be observed that there can be several such boundary regions.

These steps are proceeded in alternation until all such points on both garments GA and GB are found. It should be noted that this procedure may ignore points in which garments GA and GB merely touch. It should be further noted that the method preferably does not stop when having found one such cycle, but needs to exhaustively go through the mesh, using, e.g., breadth-first-search or depth-first-search, both outside as well as inside the regions defined by the cycle. Optionally, the procedure can be given a criterion at which to stop the recursive search for these polygonal cycles. Such criterion could be the number of iterations or a quantitative criterion, e.g. the size of the cycle or the like.

From this sequence/hierarchy of intersection objects D35, respective overlap section objects can be determined. In this three-dimensional case, each overlap section object of a respective garment is a portion of the surface of the respective mesh bounded by one of the cycles of intersection points of the respective garment, where the surface of the inner garment leaves the interior of the outer garment, wherein the portion of the surface of the respective mesh is bounded by the one of the cycles of intersection points only, or is further bounded by a further one of the cycles of intersection points of the respective garment, where the surface of the inner garment re-enters the interior of the outer garment.

After these steps, the procedure stored a set of polygonal cycles that determine which parts of the mesh of the inner garment GB are outside of the outer garment GA. For simplicity of exposition, it is assumed that the method subdivides both meshes at each such cycle and re-triangulates them. However, this step can also be done during the detection of the cycles. Thus, the relative interior of any triangle of the inner garment GB is either entirely inside or outside of the outer garment GA. However, this step can be omitted when using, e.g., a differential mesh representation.

As in the two-dimensional case, there are different approaches to remove the undesired overlaps. Depending on the vertex representation, the vertices on the outside can either be moved, e.g., along their normal vectors, until they are inside the outer garment GA, or the corresponding parts of inner garment GB are replaced by the parts of the outer garment GA bounded by the cycles. The analogous operations apply when the outer garment GA is altered instead of inner garment GB. In both cases the points may be moved slightly further towards the inside of the outer garment GA to prevent visual artifacts by the rendering engine.

If both meshes are altered, the cycles readily define two parts that should be interpolated. The method can use, e.g., mesh morphing to construct a mesh that is "in-between" the two parts, again optionally picking the stage of the morph according to the modeled material properties. Existing morphing algorithms can directly be applied by setting correspondence points at the vertices of the cycles where inner garment GB leaves the outer garment GA. Also, alpha mapping can be applied to the parts of the inner garment GB outside of the outer garment GA.

As in the 2D case, in particular Case A, approach b), it may not be sufficient to move the vertices of inner garment GB to the interior of the outer garment GA, e.g., the case where there is a single triangle of inner garment GB that is involved in the overlap. It may also be observed that, in three dimensions, it may not be sufficient to have a vertex in the inner garment GB for every vertex of the outer garment GA. Thus, the method can find, for every edge of the outer garment GA, in particular in the relevant region, a corresponding chain of edges in the inner garment GB, such that the end vertices of the chain are moved to the vertices of the corresponding edge on the outer garment GA, and the vertices of inner garment GB along the chain are mapped to points on the edge of the outer garment GA. Again, if the outer garment GA is modified instead of inner garment GB, the analogous procedure is done with the roles of garments GA and GB swapped.

It should be noted that the above steps can either be done one after the other, e.g. determining the boundaries of parts of inner garment GB outside the outer garment GA and then removing them, or on the fly, e.g. moving vertices of inner garment GB during the search for a new boundary. While both alternatives may result in slightly different modifications of inner garment GB, e.g. as intersection points may already vanish before being detected, both variants result in the inner garment GB being inside the outer garment GA.

It should be noted that the result achieved here is similar to removing the parts of the inner garment GB that are not inside the outer garment GA. However, such an operation would disconnect the surface of inner garment GB, which is not the case here. The method maintains the invariant that the inner garment GB has a single closed surface. Alternatively, one may obtain the parts of inner garment GB that are contained in the outer garment GA and pick one connected part. This choice is equivalent to choosing the starting point for the operation discussed in the beginning of this section.

While in the above operations the intersection objects and the overlap section objects are not concerned with openings respectively opening objects, there can be configurations, wherein intersection objects and opening objects may interfere. Hence, there may be a necessity for handling openings in this three-dimensional case.

For example, the boundary of an opening is a non-self-intersecting polygonal cycle whose edges are also edges of the mesh of garment model GA. For each such cycle C, the method according to the improved processing concept distinguishes between three cases. Either (I) each point on cycle C is outside the inner garment GB, (II) each point is inside the inner garment GB, or (III) some points are inside and some are outside. These three cases can be distinguished by selecting an arbitrary point on cycle C, determining whether it is inside or outside of the inner garment GB, and obtaining the intersection points of the surface mesh of inner garment GB with the edges of cycle C.

If there is no intersection of the mesh of inner garment GB and cycle C and the arbitrary point on cycle C is outside of B, then the method does not alter the models.

If there exists an intersection of cycle C and inner garment GB, the mesh of inner garment GB may be subdivided such that the intersection point is a vertex of inner garment GB. Then, the procedure generates a polygonal chain C' on the surface of inner garment GB that starts at this point and ends at the next point of C where it leaves the inner garment GB. The vertices of this curve can be found by various variants.

For example, the vertices can be found by finding a sequence of points that minimize the sum of squared distances to the corresponding vertices of cycle C. In addition or as an alternative, the vertices can be found by finding a chain that minimizes the Fréchet distance between the relevant part of cycle C and the chain. Another option is finding the points on inner garment GB that are first hit by the normal rays along cycle C. Furthermore, a mesh morphing algorithm can be applied, keeping track of where the corresponding part of C is mapped to.

As the boundary of an opening respectively opening object will usually occur at edges with not well-defined surface normal vectors, e.g. the end of a collar, the normal vectors used may, e.g., be those that are defined on a triangle not in the opening but next to the chain C.

When altering only one garment model, say, inner garment GB, the mesh of inner garment GB is subdivided along cycle C' and the vertices of cycle C' are moved to the corresponding positions along cycle C. If the vertices of the mesh of inner garment GB are in a format that allow for mesh editing, then this procedure will lead to improved visual and technically correct results. If both meshes are manipulated, the method finds a path C" to which the part of cycles C and C' are mapped to, e.g., by a mesh morphing algorithm, and with the option of taking material properties into account.

For the third case III, if cycle C is entirely inside the inner garment GB, the method determines a polygonal cycle C' on the mesh of the inner garment GB. This can be done, e.g., with the methods described in the previous case. For instance, determining the closest points according to the various criteria, by mesh morphing, or determining intersection points from surface normal vectors. Again, either the vertices on the cycle C' are mapped to the corresponding points on cycle C, or the vertices of cycle C are mapped to points on cycle C', or an intermediate cycle C" is constructed, as in the previous case.

In case that applying such a step results in a self-overlap of inner garment GB, the mesh may be further altered using a mesh repair algorithm or a human operator. Applying these steps to the boundary cycle of each opening results in a modification of the mesh of inner garment GB, such that all the intersections identified before are either entirely inside an opening of the outer garment GA, in which case the procedure does not alter any garment model, or entirely outside any opening, in which case the overlap is corrected following the chosen variant. The procedure can be adapted to either correct overlaps when changing the vertices to the openings, or to completely postpone the handling of these overlapping parts to the step described above in conjunction with the correction of overlaps without openings being involved.

Figure 13:
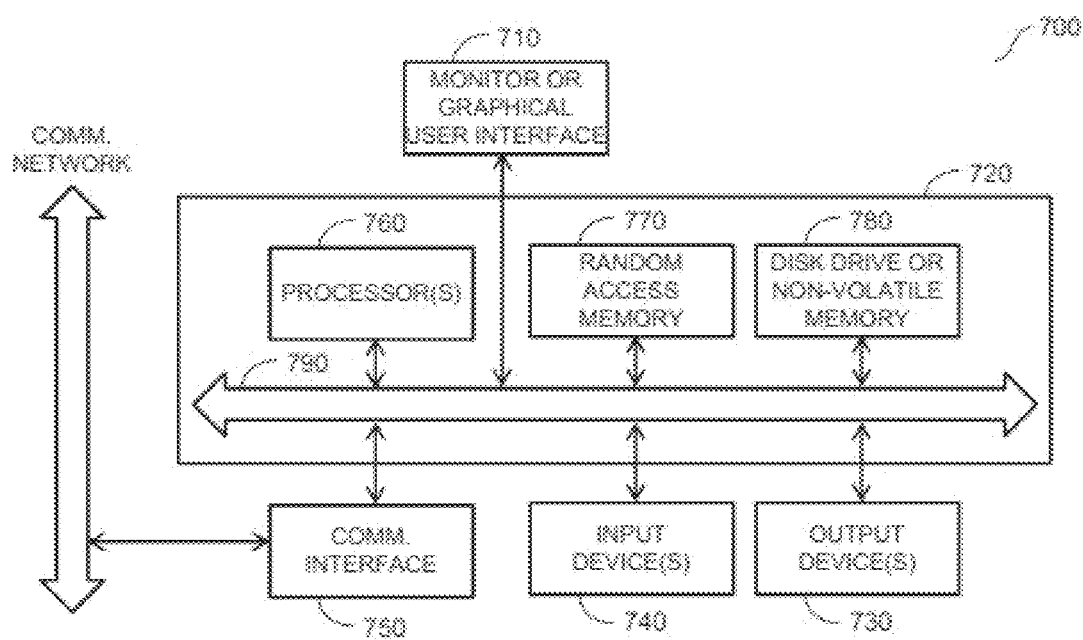
FIG. 13 shows an example system for processing model data of a set of garments according to the improved processing concept.

FIG. 13 is a block diagram of a computer system that may incorporate embodiments according to the improved processing concept. FIG. 13 is merely illustrative of an embodiment incorporating the improved processing concept and does not limit the scope of the invention as recited in the claims. One of ordinary skill in the art would recognize other variations, modifications, and alternatives.

In one embodiment, computer system 700 typically includes a monitor 710, a computer 720, user output devices 730, user input devices 999, communications interface 750, and the like.

As shown in FIG. 13, computer 720 may include a processor(s) 760 that communicates with a number of peripheral devices via a bus subsystem 790. These peripheral devices may include user output devices 730, user input devices 740, communications interface 750, and a storage subsystem, such as random access memory (RAM) 770 and disk drive 780

User input devices 740 include all possible types of devices and mechanisms for inputting information to computer system 720. These may include a keyboard, a keypad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, drawing tablet, voice command system, eye tracking system, and the like. User input devices 740 typically allow a user to select objects, icons, text and the like that appear on the monitor 710 via a command such as a click of a button or the like. User input devices 740 may also include color and/or depth cameras, body shape and/or pose tracking sensors, hand tracking devices, head tracking devices or the like. User input devices 740 may particularly include various types of cameras, e.g. a DSLR camera or a camera of a smartphone or the like. Such camera or smartphone or other mobile device may be connected to computer 720 over a communication network connected via communications interfaces 750.

User output devices 730 include all possible types of devices and mechanisms for outputting information from computer 720. These may include a display (e.g., monitor 710), non-visual displays such as audio output devices, etc.

Communications interface 750 provides an interface to other communication networks and devices. Communications interface 750 may serve as an interface for receiving data from and transmitting data to other systems. Embodiments of communications interface 750 typically include an Ethernet card, a modem (telephone, satellite, cable, ISDN), (asynchronous) digital subscriber line (DSL) unit, FireWire interface, USB interface, wireless connections like Wi-Fi and Bluetooth, and the like. For example, communications interface 750 may be coupled to a computer network, to a FireWire bus, or the like. In other embodiments, communications interfaces 750 may be physically integrated on the motherboard of computer 720, and may be a software program, such as soft DSL, or the like.

In various embodiments, computer system 700 may also include software that enables communications over a network such as the HTTP, TCP/IP, RTP/RTSP protocols, and the like.

RAM 770 and disk drive 780 are examples of tangible media configured to store data, including executable computer code, human readable code, or the like. Other types of tangible media include solid state drives, SSD, floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive 780 may be configured to store the basic programming and data constructs that provide the functionality of the improved modelling concept.

Software code modules and instructions that provide the functionality of the improved processing concept may be stored in RAM 770 and disk drive 780. These software modules may be executed by processor(s) 760. RAM 770 and disk drive 780 may also provide a repository for storing data used in accordance with the present invention.

RAM 770 and disk drive 780 may include a number of memories including a main random access memory (RAM) for storage of instructions and data during program execution and a read only memory (ROM) in which fixed instructions are stored. RAM 770 and disk drive 780 may include a file storage subsystem providing persistent (non-volatile) storage for program and data files. RAM 770 and disk drive 780 may also include removable storage systems, such as removable flash memory.

Bus subsystem 790 provides a mechanism for letting the various components and subsystems of computer 720 communicate with each other as intended. Although bus subsystem 790 is shown schematically as a single bus, alternative embodiments of the bus subsystem may utilize multiple busses.

FIG. 13 is representative of a computer system capable of embodying the improved processing concept. It will be readily apparent to one of ordinary skill in the art that many other hardware and software configurations are suitable for such use. For example, the computer may be a mobile device, in particular a mobile phone, or desktop, portable, rack-mounted or tablet configuration. Additionally, the computer may be a series of networked computers.

Various embodiments of the improved processing concept can be implemented in the form of logic in software or hardware or a combination of both. The logic may be stored in a computer readable or machine-readable storage medium as a set of instructions adapted to direct a processor of a computer system to perform a set of steps disclosed in embodiments of the improved processing concept. The logic may form part of a computer program product adapted to direct an information-processing device to automatically perform a set of steps disclosed in embodiments of the improved processing concept.

The specification and drawings are, accordingly, to be regarded in an illustrative rather than a restrictive sense. However, it will be evident that various modifications and changes may be made thereunto without departing from the scope of the invention as set forth in the claims.

The invention claimed is:

1. A computer implemented method for processing model data of a set of garments, the method comprising
storing, in a computer system, first model data of a first garment of the set and second model data of a second garment of the set, each of the first and the second model data comprising two-dimensional or three-dimensional geometry data defining a mesh associated with a respective garment of the set of garments, wherein a limiting object of the respective garment is defined by at least a portion of the two-dimensional or three-dimensional geometry data and constitutes a separation between an interior and an exterior of the respective garment, and wherein one of the first garment and the second garment is an inner garment and an other one of the first garment and the second garment is an outer garment that is worn over the inner garment;
storing, in the computer system, at least one opening object for the outer garment, each opening object defined as a portion of the respective limiting object and constituting a potential transition for an item between the interior and the exterior of the outer garment;
determining, in the computer system, intersection objects for each of the first garment and the second garment, the intersection objects defining one or more intersections between the limiting objects of the first garment and the second garment;
determining, in the computer system, for each of the first garment and the second garment, portions of the limiting objects as overlap section objects bounded by one or more of the intersection objects of the respective garment; and
adjusting, in the computer system, the geometry data of the first garment and/or the second garment with respect to the overlap section objects based on whether the respective overlap section object of the outer garment at least partially comprises one or more of the at least one opening objects of the outer garment,
wherein, if the model data comprise two-dimensional geometry data,
each limiting object of a respective garment is a closed continuous outline of the respective mesh;
each opening object of a respective garment is a portion of the closed continuous outline of the respective mesh;
each intersection object of a respective garment is an intersection point of the closed continuous outline of the respective mesh; and
each overlap section object of a respective garment is a portion of the closed continuous outline of the respective mesh bounded by two of the intersection points of the respective garment; and/or
if the model data comprise three-dimensional geometry data,
each limiting object of a respective garment is a surface of the respective mesh;
each opening object of a respective garment is a portion of the surface or a boundary of the surface of the respective mesh;
each intersection object of a respective garment is a cycle of intersection points of the respective mesh; and
each overlap section object of a respective garment is a portion of the surface of the respective mesh bounded by at least one of the cycles of intersection points of the respective garment.

2. The method according to claim 1, wherein adjusting the geometry data of the first and/or the second garment is based on one of the following configurations being detected:
A) a respective overlap section object of the outer garment comprises no opening object of the outer garment;
B) the respective overlap section object of the outer garment in full comprises one of the at least one opening object of the outer garment at least partially;
C) only a part of the respective overlap section object comprises one of the at least one opening objects of the outer garment at least partially;
D) the respective overlap section object of the outer garment comprises two or more of the at least one opening objects of the outer garment at least partially.

3. The method according to claim 1, further comprising determining the at least one opening object based on semantic labeling of the first and second model data of the respective garment and/or on an determination of intersections with an avatar or body model.

4. The method according to claim 1, wherein the meshes associated with the first garment and the second garment are formed at least by a plurality of points or vertices and by a plurality of faces in connection with the plurality of points or vertices, and wherein determining the intersection objects comprises
selecting one of the plurality of points or vertices on the limiting object of the inner garment in the interior of the outer garment as a starting point;
traversing from the starting point on the limiting object of the inner garment until the limiting object of the outer garment is crossed, thereby determining at least one intersection point of the intersection objects.

5. The method according to claim 1, wherein,
if the model data comprise two-dimensional geometry data, the overlap section objects of the inner garment and the outer garment are each bounded by two intersection points P and Q on the closed continuous outlines of the inner garment and the outer garment; and
if there is no opening object on the closed continuous outline of the outer garment between the two intersection points P and Q, adjusting the geometry data of the first garment and/or the second garment comprises adjusting a complete portion of the closed continuous outline of the inner garment and/or the outer garment bounded by the two intersection points P and Q.

6. The method according to claim 1, wherein,
if the model data comprise two-dimensional geometry data, the overlap section objects of the inner garment and the outer garment are each bounded by the two intersection points P and Q on the outlines of the inner garment and the outer garment; and
if the two intersection points P and Q are both comprised by the same opening object on the outline of the outer garment, adjusting the geometry data of the first garment and/or the second garment comprises leaving a complete portion of the outline of the inner garment and the outer garment bounded by the two intersection points P and Q without adjustments.

7. The method according to claim 1, wherein,
if the model data comprise two-dimensional geometry data, the overlap section objects of the inner garment and the outer garment are each bounded by the two intersection points P and Q on the outlines of the inner garment and the outer garment; and
if one point R of the two intersection points P and Q is not comprised by an opening object on the outline of the outer garment and there is one endpoint E of an opening object on the portion of the outline of the outer garment bounded by the two intersection points P and Q, adjusting the geometry data of the first garment and/or the second garment comprises determining an outline point R' on the outline of the inner garment in the vicinity of the endpoint E, and adjusting a portion of the outline of the inner garment bounded by the point R and the outline point R' and/or a portion of the outline of the outer garment bounded by the point R and the endpoint E.

8. The method according to claim 1, wherein,
if the model data comprise two-dimensional geometry data, the overlap section objects of the inner garment and the outer garment are each bounded by the two intersection points P and Q on the outlines of the inner garment and the outer garment; and
if there is a sequence S of endpoints of at least one opening object on the portion of the outline of the outer garment bounded by the two intersection points P and Q, adjusting the geometry data of the first garment and/or the second garment comprises determining a sequence S' of outline points on the outline of the inner garment, each of the outline points of the sequence S' being in the vicinity of a corresponding endpoint of the sequence S, and adjusting such portions of the outline of the inner garment that are bounded by two of the outline points of the sequence S' and that are not associated with an opening object and/or such portions of the outline of the outer garment that are bounded by two of the endpoints of the sequence S and that do not comprise an opening object.

9. The method according to claim 1, wherein adjusting an outline and/or a portion of an outline comprises adjusting points or vertices associated with the respective closed continuous outline and points or vertices in the vicinity of the respective closed continuous outline.

10. The method according to claim 1, wherein,
if the model data comprise three-dimensional geometry data, each overlap section object of a respective garment is a portion of the surface of the respective mesh bounded by one of the cycles of intersection points of the respective garment, where the surface of the inner garment leaves the interior of the outer garment, wherein the portion of the surface of the respective mesh is bounded by the one of the cycles of intersection points only, or is further bounded by a further one of the cycles of intersection points of the respective garment, where the surface of the inner garment re-enters the interior of the outer garment.

11. The method according to claim 1, further comprising storing, in the computer system, avatar model data of an avatar, on which the garments of the set are worn, the avatar model data comprising two-dimensional or three-dimensional geometry data defining a mesh associated with the avatar, wherein a limiting object of the avatar is defined by at least a portion of the two-dimensional or three-dimensional geometry data and constitutes a separation between an interior and an exterior of the avatar;
determining, in the computer system, intersection objects for the avatar and for an innermost garment of the set, the intersection objects defining one or more intersections between the limiting object of the avatar and the limiting object of the innermost garment;
determining, in the computer system, for the avatar and the innermost garment, portions of the limiting objects as overlap section objects bounded by one or more of the intersection objects of the avatar and the innermost garment; and
adjusting, in the computer system, the geometry data of the avatar and/or the innermost garment with respect to the respective overlap section objects.

12. The method according to claim 1, further comprising storing, in the computer system, third model data of a third garment of the set of garments, the third model data comprising two-dimensional or three-dimensional geometry data defining a mesh associated with the third garment, wherein a limiting object of the third garment is defined by at least a portion of the geometry data and constitutes a separation between an interior and an exterior of the third garment;
storing, in the computer system, at least one opening object for the third garment, each opening object defined as a portion of the limiting object of the third garment and constituting a transition for an item between the interior and the exterior of the third garment;
determining, in the computer system, intersection objects for the third garment, the intersection objects defining one or more intersections between the limiting object of the third garment and the limiting object of one of the first garment and the second garment;
determining, in the computer system, for each of the respective garments of the set of garments, portions of the limiting objects as overlap section objects bounded by one or more of the intersection objects of the respective garment; and
adjusting, in the computer system, the geometry data of the respective garments with respect to the overlap section objects.

13. The method according to claim 1, wherein the item is a garment or an avatar.

14. A computer program product for processing model data of a set of garments, the computer program product comprising a non-transitory computer readable storage medium and computer program instructions stored therein enabling a computer system, upon executing the computer program instructions, to execute a method according to claim 1.

* * * * *